United States Patent [19]
Braet

[11] Patent Number: 5,848,179
[45] Date of Patent: Dec. 8, 1998

[54] REPRODUCTION METHOD FOR MEDICAL IMAGES PROVIDING OPTIMAL QUALITY FOR DIAGNOSIS

[75] Inventor: Johan Maria Braet, Boechout, Belgium

[73] Assignee: AGFA-Gevaert, Mortsel, Belgium

[21] Appl. No.: 945,611

[22] Filed: Sep. 16, 1992

[30] Foreign Application Priority Data

Sep. 27, 1991 [EP] European Pat. Off. ............ 91202511.1

[51] Int. Cl.⁶ .................................................... G06K 9/00
[52] U.S. Cl. ............................ 382/132; 382/169; 382/274
[58] Field of Search ............................... 382/51, 128, 132, 382/169, 274; 364/413.13

[56] References Cited

U.S. PATENT DOCUMENTS

| | | | |
|---|---|---|---|
| 3,983,320 | 9/1976 | Ketcham et al. | 178/6.8 |
| 4,302,672 | 11/1981 | Kato et al. | 367/414 |
| 5,042,077 | 8/1991 | Burke | 382/51 |
| 5,046,118 | 9/1991 | Ajewole et al. | 382/132 |
| 5,067,163 | 11/1991 | Adachi | 382/51 |
| 5,140,649 | 8/1992 | Kageyama | 382/51 |
| 5,150,421 | 9/1992 | Morishita et al. | 382/51 |
| 5,164,993 | 11/1992 | Capozzi et al. | 382/132 |
| 5,172,419 | 12/1992 | Manian | 382/132 |
| 5,224,177 | 6/1993 | Doi et al. | 382/51 |
| 5,265,200 | 11/1993 | Edgar | 382/51 |
| 5,297,036 | 3/1994 | Grimand | 382/132 |

FOREIGN PATENT DOCUMENTS

| | | | |
|---|---|---|---|
| 9203855 | 5/1992 | European Pat. Off. | H01N 1/46 |
| 3408337 | 9/1984 | Germany | H04N 5/20 |
| 4004948 | 8/1991 | Germany | H04N 1/00 |

OTHER PUBLICATIONS

Acta Radiological Diagnosis vol. 4, 1966, pp. 463–476.

*Primary Examiner*—Leo Boudreau
*Assistant Examiner*—D. R. Anderson
*Attorney, Agent, or Firm*—Richard J. Birch

[57] ABSTRACT

The invention provides a method of reproducing medical images so that optimal image quality for diagnosis is obtained through the use of a specific relation between digital signal values and corresponding density values in the hard copy and by means of a preliminary evaluation of the histogram of the image before reproduction.

10 Claims, 5 Drawing Sheets

FIG.4

REPRODUCTION METHOD FOR MEDICAL IMAGES PROVIDING OPTIMAL QUALITY FOR DIAGNOSIS

FIELD OF THE INVENTION

The present invention is in the field of reproduction of medical images. The invention more specifically relates to a system for analysing an image signal representation of a medical image and for processing the image signal so that optimum image quality for diagnostic purposes is obtained in the reproduction.

DESCRIPTION OF THE PRIOR ART

In the field of medical imaging it is nowadays common practice to acquire first a representation of the image in an electrical form (digital or analog signal) and to use this electrical representation to control the hard copy recording of the image.

This electrical representation can be acquired through computation as for example in computerised tomography, digital fluorography, ultrasound detection, nuclear magnetic resonance, positron emission tomography etc.

Alternatively it can be acquired through the use of an intermediary storage device such as a photostimulable phosphor screen. In this case an object to be examined is irradiated by x-rays and the transmitted x-rays generate an image on the phospor screen. Next, the phosphor screen is stimulated by scanning it with laser light of suitable wavelength and the stimulated emission is detected and converted into an electrical signal. Suitable stimulable phosphors and adapted stimulation systems are extensively described in European Patent Application 91200511.3 filed on 8.03.91.

Image acquisition systems frequently provide data in the electrical form occupying a larger bit range than the bit range that is used in most recording systems. Before imaging (display or reproduction) a selection out of the larger bit range has to be made of a smaller bit range comprising the data in which the radiologist is most interested.

For example, most image acquisition systems provide at their output a digital 12 bit signal representative of the medical image. Due to visual perception backgrounds, mostly 8 bit data are used in medical imaging, more specifically in display and reproduction.

This means that whatever examination has been done, the image information is to be given in 8 bit level data, so out of the entire range of acquired image data (for example 12 bit large), a certain range is to be selected and converted into 8 bit data. A suchlike operation is called window leveling. The so-called "window" W indicates the bit range of the selected values (for example W is 256 bit subrange selected so that 0<W<4096) and the so-called "level value" gives the information where this range is to be positioned within the available 12 bit range. Mostly the level indicates the centervalue of the selected range (window) but in some applications it indicates the start value of the selected range.

The digital signal obtained by the image acquisition system is applied to a recording system, eventually after being processed, so that a density varying pattern representing the medical image is obtained on a recording material.

For this purpose a relation has to be defined between digital signal values and corresponding densities into which they will be converted in the hard copy. This kind of relation is often implemented in the form of a look up table.

When the output signal of an image acquisition systems as described hereinbefore is applied to a hard copy recording system often a hard copy image results having an image quality that is inferior to the quality required for medical diagnosis. Frequently appearing imperfections in the hard copy are poor image contrast, spatial contouring etc. These phenomena may have several causes that can in some cases be found at the side of the image acquisition system: for example in the specific form of the output signal, in the use of a non-optimal contrast transfer function, in spatial image transformation or at the side of the recording system: for example wrong video digitization, wrong calibration, non-optimal conversion of digital signal values into corresponding density values etc.

It may further occur that the window parameters are incorrectly set so that important information is lost or so that the selection has a negative influence on the conversion of the data into density values in the reproduction.

Frequently the image acquisition system and the recording system are not matched to each other. The systems are often installed by different manufacturers that have to agree on the specification of the devices, of the image processing etc. thereby taking into account the opinion of the radiologist.

Often the ultimate decision on the adjustment of the devices is based on the subjective interpretation of the manufacturers and/or the radiologist, no objective norm is used.

OBJECTS OF THE INVENTION

It is an object of the present invention to provide a method of reproducing a medical image represented by a digital image signal so that optimal image quality for diagnostic purposes is obtained.

It is another object of the present invention to provide a method of evaluating the image quality of a reproduction of a medical image in an objective way and of tracing the causes of inferior image quality with respect to the diagnostic requirements such as spatial contouring, poor contrast, etc. in the reproduction of the medical image and of remedying the inferior image quality.

It is a further object of determining and eventually amending the window in image acquisition systems so as to provide a broader contrast range.

Still further objects will become apparent from the description given hereinafter.

STATEMENT OF THE INVENTION

According to the present invention the above objectives are achieved by a method of making a hard-copy on a recording material of an image represented by an N-bit digital signal for inspection on a light-box comprising the step of processing said signal by mapping the signal values onto corresponding density values according to a transfer curve characterised in that said processing comprises a non-uniform quantisation of said density values wherein increments between a first and a second density value corresponding with successive signal values correspond with the minimum perceptible density difference at said first surrounding density.

Preferably a small gradient is allocated to said transfer curve in the low density region, a higher gradient in the intermediate density region and a still higher level in the high density region.

According to a preferred embodiment of the present invention the method comprises the steps of determining $2^N$ density values to correspond with $2^N$ digital signal values by mapping the minimum and the maximum signal value respectively onto the minimum and the maximum density value envisioned in the hard-copy and by calculating intermediate density values as $D_{i+1}=D_i+\text{Delta } D_i$ wherein $$\text{Delta } D_i = \log\left[1 - \left[0.0123 \times \frac{[0.808 + (lum_i + \text{alfa})^{1/2}]^2}{lum_i}\right]\right],$$

$D_i$ being an intermediate density value between $D_{min}$ and $D_{max}$, alfa being an integer value between 0 and 1040, $lum_i=\text{lumscale}.\pi.10^{-Di}$ being the specific illuminance level caused by $D_i$ expressed in cd/m² and lumscale being the luminance of said light-box, and by interpolating between the calculated density values, mapping successive intermediate signal values onto the determined successive density values, and converting the signal values into corresponding density values in the hard copy.

The calculation of the density values as hereinbefore described is based on a theory developed by H. Kanamori. This theory is extensively described in Acta Radiologica Diagnostica, Vol. 4, 463 (1966).

In the study by Kanamori a series of curves were developed that indicate for particular environmental circumstances the minimum density difference within a given surrounding density that can still be detected by the human eye.

These minimum density differences are now used for calculating successive density levels onto which successive digital values will be mapped.

Although a broad range of curves defined by the theory of Kanamori can be generated, it is preferred that those curves are selected that, given a fixed $D_{min}$ and a fixed $D_{max}$, have an intrinsic addressability of about 256 levels so as to be matched to the output performance of the reproducing device.

The method of the present invention provides that images can be reproduced with optimal image quality for diagnostic purposes irrespective of the kind of application or the content of the image.

The parameters that are of primary importance in viewing performance, namely the minimum and maximum film density and the ambient viewing conditions, more specifically the illuminance of the light-box used for inspection of the hard copy, are taken into account when determining the relation between digital signal values and corresponding density values envisioned in the reproduction. This specific relation described by the equation in claim 1 provides optimal contrast performance matched to the detectability curve of the eye.

This relation provides that a given distribution of data will be perceived equally contrasted irrespective of the absolute position on the digital signal value axis.

Further the use of this relation has a positive effect on the image quality of a hard-copy of an image in case smoothing has been applied to the image.

In prior art recording systems the relation between digital signal values and corresponding density values was not determined by means of the equation as hereinbefore described. Further the window range for selection of a minor bit range out of a larger bit range of incoming data was set relatively large to assure that no relevant image data were lost.

When developing the look up table representing the conversion of digital data into density values, the number of addressable levels is given by W/D, W being the window range and D being equal to ½ⁿ in an n-bit system.

When the part of the histogram of an image comprising data non-equal to zero was small relative to the set window range, a large number of these available density levels were to be sacrificed to cover empty histogram places (where the histogram value is zero), and only the remainder was available for the relevant non-zero histogram data. As a consequence additional contouring artefacts appeared due to the lack of addressability in the contrast region of interest.

A further cause of contouring is the fact that in some applications the images provided by the image acquisition device have a very poor content. In some applications only 40 levels are present in the original image. In this case the histogram shows a lot of so-called intrinsic spikes that are also a cause of contouring artefacts.

Generally contouring is related to the contrast performance of the system. The spatial appearance is dependent on the frequency content of the application. For example in DSA (digital subtraction angiography) contouring occurs in the form of large area contouring, also called landscaping, whereas in CT-applications (computerised tomography) micro-contouring, also called blocky noise or pixel noise, occurs.

In the above described situations smoothing might be a solution for enhancing the image quality. However, when an image is subjected to a smoothing step, the result hereof is not only dependent on the outcome of the smoothing algorithm used but also on the availablility and the location of intermediate levels.

It was possible in prior art devices that due to shortness of non-addressed intermediate levels (for the reasons enumerated hereinbefore) smoothing was not possible or hardly noticable.

The use of the very specific transfer curve for determining the density levels in correspondence with the digital signal levels as disclosed in the present invention provides the maximum of available density levels because the density difference in between successive density levels is the minimal density difference that can be perceived by the human eye. In this way enough intermediate levels are available for smoothing purposes.

According to a specific embodiment of the present invention the conversion of digital values into a density pattern in the hard copy is preceded by tracing possible causes of inferior image quality. For this purpose the image histogram is calculated and evaluated. As a consequence of the evaluation performed on the histogram it may be possible that the image signal is processed and that an amended image, corresponding with for example another part of the histogram, is reproduced by mapping the signal values corresponding with the amended image onto the determined density values and then converting the signal values into the determined densities values in the hard-copy.

The processing that is performed in most cases comprises a linear re-scaling of the histogram data.

Preferably the histogram is further subjected to histogram equalisation. Histogram equalisation is a histogram transformation technique that is well known in the art. According to this technique the cumulative histogram is calculated and the pixel values are mapped into modified pixel values according to a mapping function defined by the cumulative histogram.

As a consequence of histogram equalisation overall contrast is improved by equally distributing the pixels in an image throughout the available grey scale.

A detailed description of this technique can be found in Digital Image Processing by William K. Pratt, page 314 and following.

By linear resealing of the histogram data a better equalisation can already be obtained. Therefore linear resealing is also referred to as pseudo-equalisation.

This specific embodiment of the invention is advantageous relative to the prior art method because an objective tool, namely the histogram of the image, is used for evaluation.

By means of the evaluation of the histogram the cause of inferior image quality can be situated as it is in a lot of cases to be found at the side of the acquisition equipment and not at the side of the reproduction equipment.

Whereas in the past evaluation was performed on the image displayed on the monitor connected to the image acquisition apparatus, now evaluation can be made independent of that monitor.

Moreover, the adjustments of the monitor of the image acquisition device may be improved by a preliminary evaluation of the histogram.

A first factor that might have a negative influence on the ultimate image quality of the hard copy is the width and the position of the selected window.

As has been described hereinbefore, image acquisition systems often provide data in a digital form occupying a larger bit range than the bit range that is used in most recording systems. For example a 12 bit signal is output by the acquisition system whereas the recording system only accepts an 8 bit signal. In such cases the image signal is commonly subjected to windowing before being reproduced.

It is possible that the windowing is erroneously performed and that the part of the original image signal that is used for controlling the recording does not correspond to the range in which the radiologist is interested or to the range wherein relevant histogram data are situated. Erroneous windowing may result in poor contrast in the reproduction, contouring may also appear.

The invention provides a method of determining the window that was used without any knowledge of the parameters that have been set at the side of the image acquisition system. The determination of the window is performed on the histogram of the image information.

For example when the window range covers a large number of signal values where the histogram value (the number of time that this signal value is present in the image signal) is about or equal to zero, this may indicate that the window was initially not very well positioned. The problem will then be solved by linearly re-scaling the pixel values so that a modified histogram results.

Preferably the cumulative histogram is also calculated and the histogram is changed by means of the histogram equalisation technique as described hereinbefore.

Next, the new signal values are transformed into density values determined with the equation described higher.

The set window can be determined as follows:
1. It can be communicated to the user by the manufacturer of the image acquisition system.
2. The exact width of the window range can be calculated by counting the spikes in the histogram of the image signal that was applied to the recording system. This will be explained by means of an example pertaining to window W representing a range selected from an original 12 bit output signal of an image acquisition system, that is mapped onto 256 density values to be recorded by an 8-bit recording system.
   a) When the window W=256×n, n being an integer, then the histogram is a continuous function, all density values are occupied, no spikes are present in the histogram.
   b) When the window range is smaller than 256, some of the available 256 density levels will not be filled up. This will result in a number of spikes down to zero in the histogram (located at the missing density levels). The number of spikes present indicates the dimensions of the window used. For example, when three equally spaced spikes down to zero are present the window range is equal to 253.
   c) In case the window range exceeds 256 levels, three different cases are to be mentioned.
      i) $n.256<W<128.(2n+1)$, $n>=1$
   In this case an amount of spikes will be present in the upward direction. Indeed, when more than 256 values are selected and have to be mapped onto 256 density levels, there is no longer a one to one relation and some data will be addressed n+1 times more. The number of spikes again gives an indication of the selected window range. For example, 3 spikes indicates that the window range equals 259.
      ii) $(2n+1).128<W<(n+1).256$
   Negative spike(s) will appear, the spikes won't reach zero but will be on n/n−1 part of the amplitude.
      iii) $W=(2n+1).128$
   When the window equals an integer multiple of 128, the denomination of the spikes (either upward spikes or downward spikes) depends on the choice of the reference curve, the number of spikes in either if the directions is equal. The modulation depth is indicated by $(n/(n-1))^{-1}$, n being an integer value that, when multiplied with 256, gives the extreme value of the window range comprising 256 values.
3. From the above explanation it will be clear that the number of spikes does not unequivocally define the window range. For example, the presence of three spikes in the histogram may indicate that the window is equal to 253 or is equal to 259 etc.

Therefore supplementary to the counting of spikes, the position of the window range within 8-bit ranges (this means for example in between zero and 256, in between 256 and 512 etc.) is further determined by curve fitting as will be explained hereinbelow.

The ratio is calculated of the amplitude of the envelope curve of the tops of the spikes (i.e. a curve fitted through the tops of the spikes) and the amplitude of the curve through the feet of the spikes, the latter being called the reference curve.
   i) When the window range is situated in between 0 and 128, the histogram shows positive spikes down to zero. The reference curve is the signal axis of the histogram. When the window range is situated in between 128 and 256, the histogram shows negative spikes down to zero. This situation requires no further calculation.
   ii) If the ratio of the amplitude of the curve through the tops of the spikes versus the amplitude of the reference curve is $2/1$ or $1/2$, the window range is in between 256 and 512. Indeed, window ranges from 256 to 386 this gives rise to doubled histogram value(s). The curve through the tops of the spikes will have doubled amplitude relative to the amplitude of the curve through the feet of the spikes. Window ranges is situated in between 384 and 512 give rise to negative spikes. The curve through the feet then has doubled amplitude relative to the curve through the tops so the determined ratio is $1/2$.
   iii) In the region between 512 and 640, spikes with triple amplitude are present. The ratio of the amplitudes of the envelope curve of the tops and the reference curve will be $3/2$. In the region between 640 and 768 the ratio will be $2/3$.

iv) This reasoning can be extrapolated for higher window ranges.

Once the window range is calculated, the positioning of said window can be evaluated.

The fact that the window is not exactly positioned so as to cover the region of major interest to the radiologist can be proved by application of the following technique. The window settings are turned down to the lowest value (mostly this is 2). Next the level values are enhanced. The image will then appear in black and white. Image data present on a level n will appear visible when shifting from a level n−2 to a level n−1 to level n.

The window range can then be adjusted by means of the joystick or the trace ball of the console of the image acquisition system to cover the region of interest to the radiologist.

However, it is preferable that the window is initially set optimally by the manufacturer of the image acquisition system.

It is furthermore possible to apply the image signal to the recorder in the form it is given by the image acquisition system and to perform further windowing before recording. For example, when the image histogram shows that the relevant data are situated at the extreme right side of the histogram axis (due to the window setting at the side of the image acquisition system), further windowing can be performed in the recorder so as to select only said extreme right side and only mapping these values onto corresponding density values for reproduction.

Since this method introduces further spikes that in their turn give rise to spatial contouring artefacts, it is preferred that the window settings are initially set in an optimum way at the side of the image acquisition system.

As already explained, spikes may give rise to spatial contouring. So, when the histogram of an image showing spatial contouring is evaluated, too large an amount of spikes (depending on the particular examination type) will be detected.

When the spikes are equidistant, the image quality can be enhanced by performing smoothing. A limited addition of non-correlated noise can also have a positive influence on the image quality.

Non-equidistant spikes in the histogram are a consequence of the provision of a conversion (8-bit to 8-bit conversion) at the side of the image acquisition system. The non-equidistant spikes can be upwardly or downwardly directed depending on the slope of the curve defining the conversion.

If in the prior art the radiologist concluded that this provision had a negative influence on the image quality for diagnostic purposes of the reproduction it was necessary to pursuade the manufacturer of the image acquisition system to leave such a conversion out of the system.

The present invention provides a solution to the problem that does not require the intervention of the manufacturer of the image acquisition system.

In accordance with the present invention the histogram of the image signal is calculated and the histogram shape is examined for the presence of non-equidistant spikes.

The specific form of the conversion that was applied can be reconstructed by careful analysis of the histogram. The effect of the conversion can be nullified by performing an inverse conversion on the image signal before recording.

It will be clear that problems would be solved when no non-linear transformation at all would be provided in the image acquisition equipment.

Particular aspects of the present invention as well as preferred embodiments thereof will be explained by means of the corresponding drawings wherein.

Figure 1:
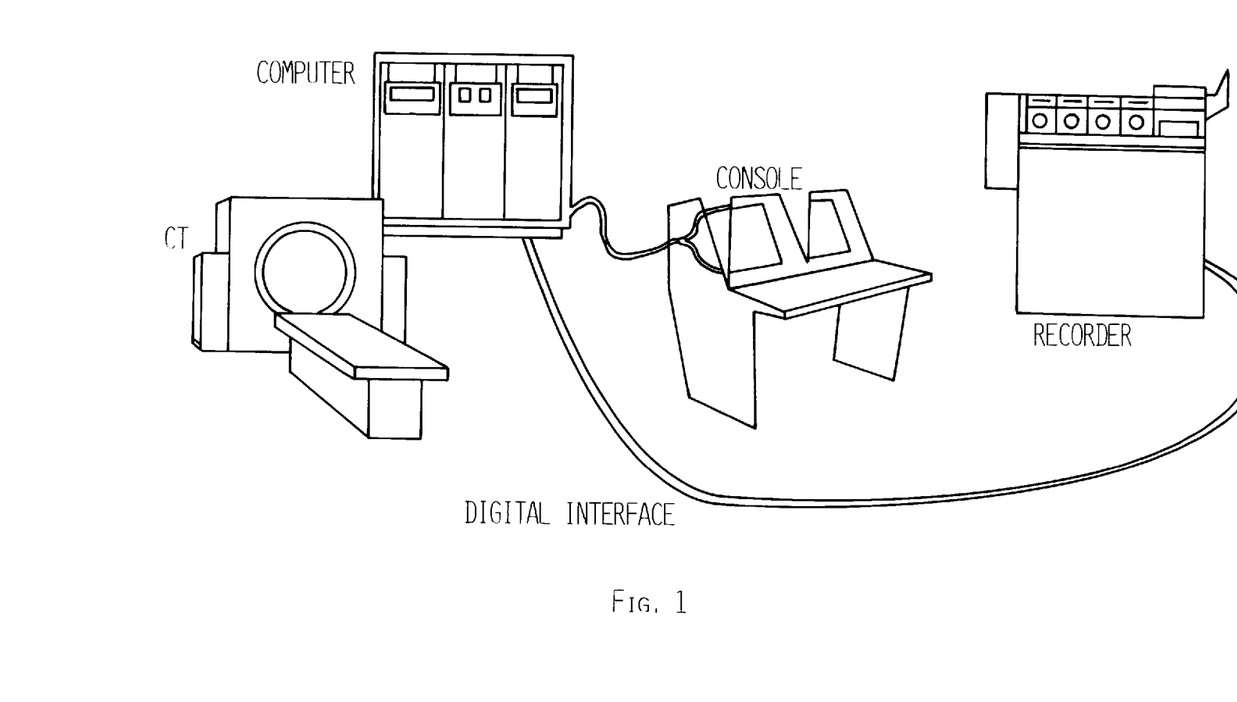
FIG. 1 represents a example of an environment wherein the method of the present invention can be applied.

The method of the present invention can for example be used in a system shown in FIG. 1 wherein a digital signal representation of a radiologic image is acquired by means of a CT-apparatus and an associated computer. Next the signal is applied to a monitor so that a first impression of the captured image can be obtained and that the exposure can eventually be adjusted. At this stage windowing and histogram evaluation can be performed.

The image signal is then further applied via a digital interface to a recording unit, for example a laser recorder (an analog interface is also possible). Alternative types of recorders such as a thermal sublimation printer may be used. The operation of such recorders is known in the art.

In the recording unit the digital image signal is processed according to the method of the present invention so that for each digital value a corresponding density value envisioned in the hard copy is determined. Next the recording head is controlled so as to produce in each pixel the density values corresponding with the digital signal value.

Figure 2A:
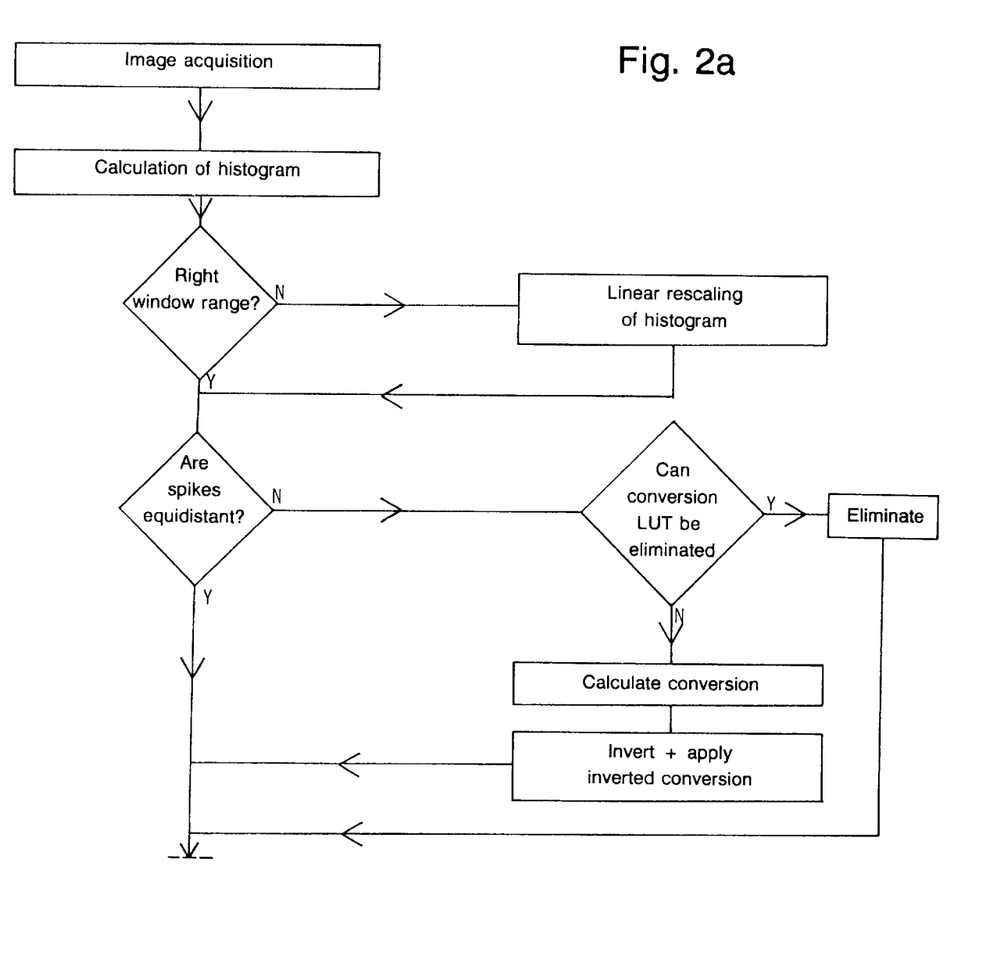
FIGS. 2a and 2b is a flow sheet illustrating the different method steps of the present invention.
Figure 2B:
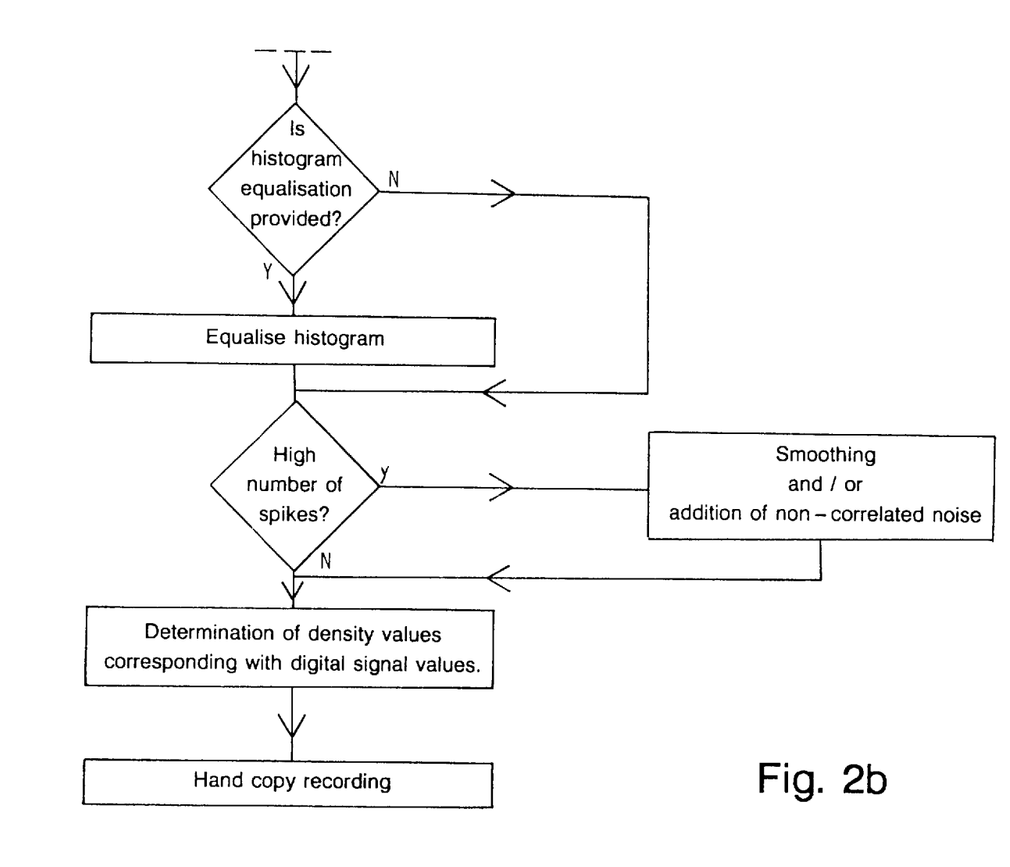

The different processing steps are illustrated in the flow chart of FIGS. 2a and 2b.

First a digital signal representation is obtained in an image acquisition apparatus of the kind described above. Next, the histogram of the digital image signal is calculated and evaluated.

The histogram is examined to get an impression of the window setting, of the presence of equidistant and non-equidistant spikes. If the window setting was erroneous, the histogram is amended by linear resealing.

Next the histogram is evaluated for the presence of equidistant or non-equidistant spikes.

If the spikes are non-equidistant this is caused by the presence of a non-linear conversion at the output of the image acquisition system. This can be remedied by first determining the applied conversion by careful studying the histogram and by applying the inverse conversion.

An alternative is to remove the conversion at the side of the image acquisition system.

In case the spikes are equidistant, the above steps are omitted.

Next histogram equalisation is performed if the equipment is provided with this feature. The original data are remapped into a new set of values so that the histogram of the transformed signal is substantially constant.

Figure 3A:
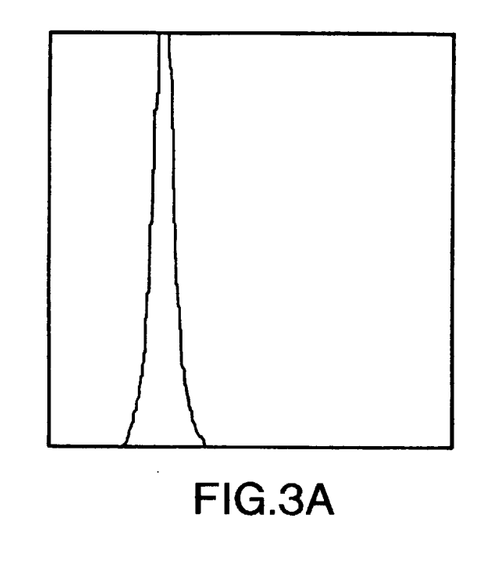
FIG. 3a shows a histogram of an image signal and, FIG. 3b shows the same histogram after being subjected to histogram equalisation.
Figure 3B:
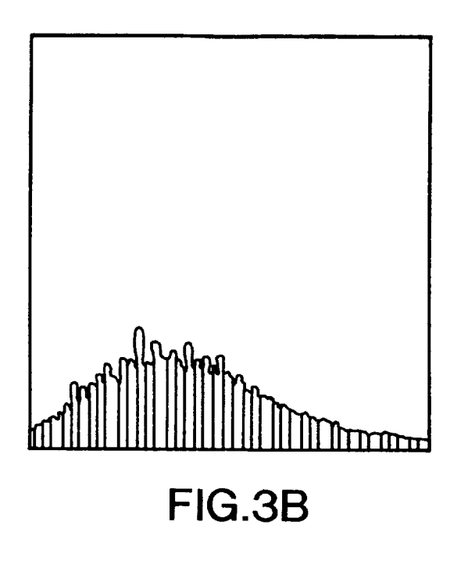

The effect of this technique on the histogram is illustrated in FIG. 3 wherein FIG. 3b shows the histogram of FIG. 3a after being subjected to histogram equalisation.

The following step is the evaluation of the number of spikes. If the number is too large, smoothing and/or addition of non-correlated noise can be applied.

When the causes of inferior image quality that are detected by examination of the histogram are solved, the method of the present invention provides in the calculation of density values corresponding with each of the digital signal values.

Finally the hard copy is produced.

The calculation of the density levels is based on the following equation:

$$\text{Delta } D_i = \log\left[1 - \left[0.0123 \times \frac{[0.808 + (lum_i + \text{alfa})^{1/2}]^2}{lum_i}\right]\right]$$

wherein i:min, . . . (max-1), 0<alfa<1040, $lum_i$= lumscale.$\pi$.$10^{-Di}$, lumscale being luminance of the lightbox expressed in cd/m² onto which the hard-copy is examined.

Figure 4:
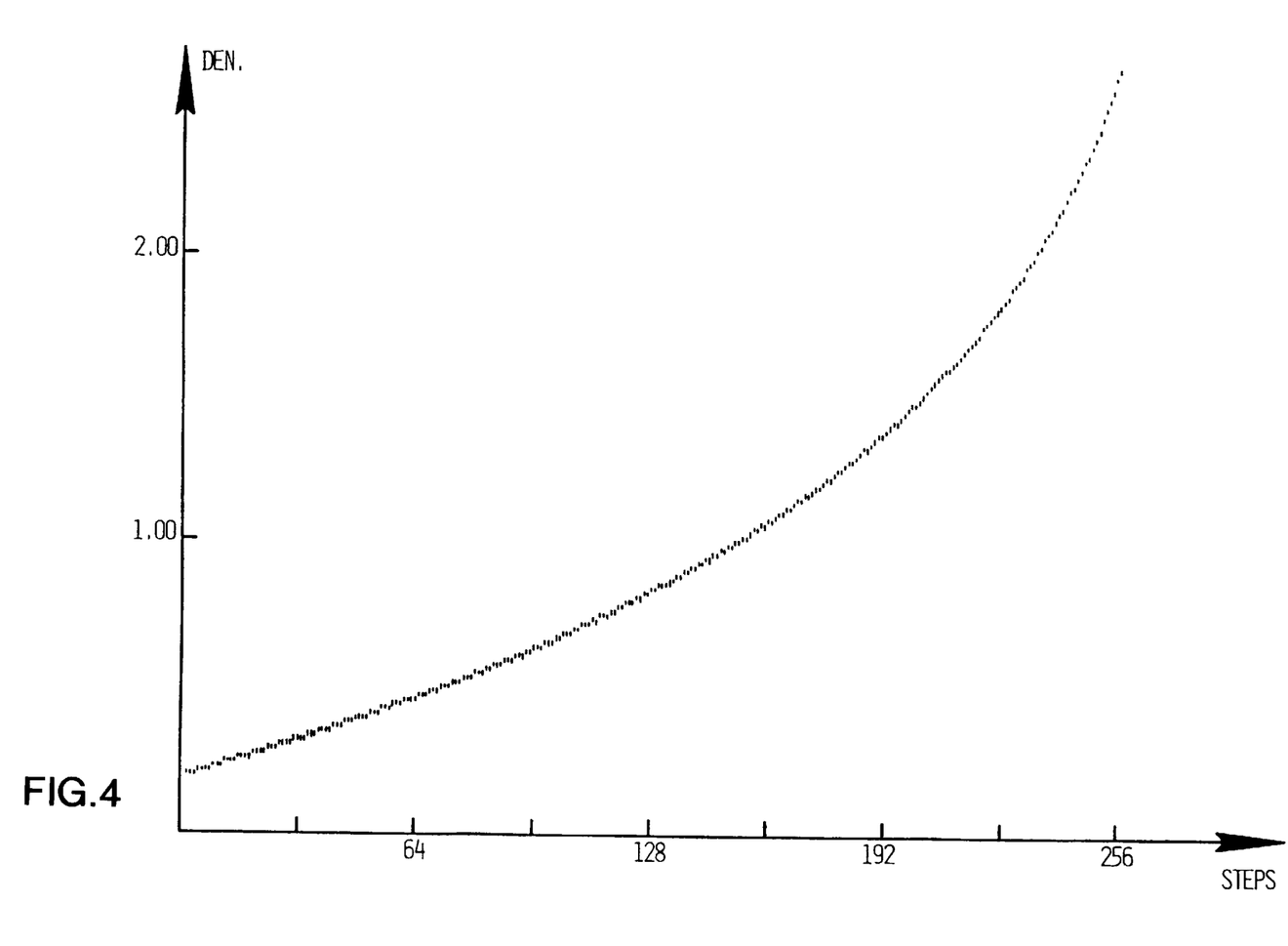
FIG. 4 represents an example of a curve according to the equation used for calculating the density differences in the method of the present invention.

In FIG. 4 one particular curve defined by this equation is shown. The density levels onto which successive digital values are mapped are enumerated in the annexed table. These values were determined as follows:

The minimum signal value corresponds with the minimum density value envisioned in the reproduction and the maximum signal value corresponds with the maximum density value envisioned in the reproduction.

Next the intermediary density values are determined as follows. Starting with $D_{min}$ the value delta D on the curve is determined and added to $D_{min}$ resulting in $D_{min+1}$. Next, delta D is determined for $D_{min+1}$ and added to $D_{min+1}$ so as to obtain $D_{min+2}$. This procedure is repeated until $D_{max}$ is obtained.

When the number of density values calculated up to this stage is smaller that $2^N$, additional values are calculated by interpolation between the calculated density values.

| Digital signal to density conversion | | | | | |
|---|---|---|---|---|---|
| 1 | 0.2100 | 62 | 0.4675 | 123 | 0.8081 |
| 2 | 0.2138 | 63 | 0.4723 | 124 | 0.8147 |
| 3 | 0.2176 | 64 | 0.4771 | 125 | 0.8213 |
| 4 | 0.2213 | 65 | 0.4819 | 126 | 0.8279 |
| 5 | 0.2251 | 66 | 0.4867 | 127 | 0.8647 |
| 6 | 0.2289 | 67 | 0.4916 | 128 | 0.8415 |
| 7 | 0.2328 | 68 | 0.4965 | 129 | 0.8484 |
| 8 | 0.2366 | 69 | 0.5014 | 130 | 0.8552 |
| 9 | 0.2404 | 70 | 0.5063 | 131 | 0.8620 |
| 10 | 0.2443 | 71 | 0.5113 | 132 | 0.8691 |
| 11 | 0.2482 | 72 | 0.5163 | 133 | 0.8761 |
| 12 | 0.2521 | 73 | 0.5213 | 134 | 0.8832 |
| 13 | 0.2560 | 74 | 0.5263 | 135 | 0.8902 |
| 14 | 0.2599 | 75 | 0.5314 | 136 | 0.8974 |
| 15 | 0.2638 | 76 | 0.5365 | 137 | 0.9046 |
| 16 | 0.2677 | 77 | 0.5416 | 138 | 0.9118 |
| 17 | 0.2716 | 78 | 0.5467 | 139 | 0.9190 |
| 18 | 0.2756 | 79 | 0.5519 | 140 | 0.9265 |
| 19 | 0.2797 | 80 | 0.5571 | 141 | 0.9339 |
| 20 | 0.2837 | 81 | 0.5622 | 142 | 0.9414 |
| 21 | 0.2877 | 82 | 0.5674 | 143 | 0.9488 |
| 22 | 0.2918 | 83 | 0.5727 | 144 | 0.9565 |
| 23 | 0.2958 | 84 | 0.5780 | 145 | 0.9643 |
| 24 | 0.2999 | 85 | 0.5833 | 146 | 0.9720 |
| 25 | 0.3039 | 86 | 0.5886 | 147 | 0.9797 |
| 26 | 0.3081 | 87 | 0.5940 | 148 | 0.9877 |
| 27 | 0.3122 | 88 | 0.5995 | 149 | 0.9956 |
| 28 | 0.3164 | 89 | 0.6049 | 150 | 1.0036 |
| 29 | 0.3205 | 90 | 0.6103 | 151 | 1.0115 |
| 30 | 0.3247 | 91 | 0.6158 | 152 | 1.0197 |
| 31 | 0.3289 | 92 | 0.6214 | 153 | 1.0279 |
| 32 | 0.3331 | 93 | 0.6269 | 154 | 1.0361 |
| 33 | 0.3373 | 94 | 0.6224 | 155 | 1.0443 |
| 34 | 0.3415 | 95 | 0.6381 | 156 | 1.0528 |
| 35 | 0.3458 | 96 | 0.6437 | 157 | 1.0613 |
| 36 | 0.3500 | 97 | 0.6494 | 158 | 1.0697 |
| 37 | 0.3542 | 98 | 0.6550 | 159 | 1.0782 |
| 38 | 0.3586 | 99 | 0.6608 | 160 | 1.0869 |
| 39 | 0.3629 | 100 | 0.6666 | 161 | 1.0956 |
| 40 | 0.3673 | 101 | 0.6723 | 162 | 1.1043 |
| 41 | 0.3716 | 102 | 0.6781 | 163 | 1.1130 |
| 42 | 0.3760 | 103 | 0.6840 | 164 | 1.1220 |
| 43 | 0.3804 | 104 | 0.6899 | 165 | 1.1311 |
| 44 | 0.3848 | 105 | 0.6958 | 166 | 1.1401 |
| 45 | 0.3892 | 106 | 0.7017 | 167 | 1.1491 |
| 46 | 0.3937 | 107 | 0.7077 | 168 | 1.1585 |
| 47 | 0.3982 | 108 | 0.7137 | 169 | 1.1678 |
| 48 | 0.4026 | 109 | 0.7197 | 170 | 1.1772 |
| 49 | 0.4071 | 110 | 0.7257 | 171 | 1.1865 |
| 50 | 0.4117 | 111 | 0.7319 | 172 | 1.1962 |
| 51 | 0.4162 | 112 | 0.7381 | 173 | 1.2059 |
| 52 | 0.4208 | 113 | 0.7442 | 174 | 1.2156 |
| 53 | 0.4253 | 114 | 0.7504 | 175 | 1.2253 |
| 54 | 0.4299 | 115 | 0.7567 | 176 | 1.2353 |
| 55 | 0.4346 | 116 | 0.7630 | 177 | 1.2454 |
| 56 | 0.4392 | 117 | 0.7693 | 178 | 1.2554 |
| 57 | 0.4438 | 118 | 0.7756 | 179 | 1.2654 |
| 58 | 0.4485 | 119 | 0.7821 | 180 | 1.2758 |
| 59 | 0.4533 | 120 | 0.7886 | 181 | 1.2863 |
| 60 | 0.4580 | 121 | 0.7950 | 182 | 1.2967 |
| 61 | 0.4627 | 122 | 0.8015 | 183 | 1.3071 |
| 184 | 1.3180 | 220 | 1.7970 | | |
| 185 | 1.3288 | 221 | 1.8145 | | |
| 186 | 1.3397 | 222 | 1.8319 | | |
| 187 | 1.3505 | 223 | 1.8494 | | |
| 188 | 1.3618 | 224 | 1.8668 | | |
| 189 | 1.3732 | 225 | 1.8854 | | |
| 190 | 1.3845 | 226 | 1.9041 | | |
| 191 | 1.3958 | 227 | 1.9227 | | |
| 192 | 1.4077 | 228 | 1.9413 | | |
| 193 | 1.4196 | 229 | 1.9613 | | |
| 194 | 1.4314 | 230 | 1.9813 | | |
| 195 | 1.4433 | 231 | 2.0013 | | |
| 196 | 1.4552 | 232 | 2.0213 | | |
| 197 | 1.1677 | 233 | 2.0429 | | |
| 198 | 1.4802 | 234 | 2.0645 | | |
| 199 | 1.4927 | 235 | 2.0861 | | |
| 200 | 1.5052 | 236 | 2.1077 | | |
| 201 | 1.5183 | 237 | 2.1313 | | |
| 202 | 1.5314 | 238 | 2.1549 | | |
| 203 | 1.5444 | 239 | 2.1785 | | |
| 204 | 1.5575 | 240 | 2.2021 | | |
| 205 | 1.5713 | 241 | 2.2280 | | |
| 206 | 1.5850 | 242 | 2.2538 | | |
| 207 | 1.5988 | 243 | 2.2797 | | |
| 208 | 1.6125 | 244 | 2.3055 | | |
| 209 | 1.6270 | 245 | 2.3342 | | |
| 210 | 1.6416 | 246 | 2.3629 | | |
| 211 | 1.6561 | 247 | 2.3915 | | |
| 212 | 1.6706 | 248 | 2.4202 | | |
| 213 | 1.6860 | 249 | 2.4524 | | |
| 214 | 1.7013 | 250 | 2.4845 | | |
| 215 | 1.7167 | 251 | 2.5167 | | |
| 216 | 1.7320 | 252 | 2.5488 | | |
| 217 | 1.7483 | 253 | 2.5863 | | |
| 218 | 1.7645 | 254 | 2.6238 | | |
| 219 | 1.7808 | 255 | 2.6612 | | |
| | | 256 | 2.6987 | | |

I claim:

1. A method of making a hard-copy on a recording material for inspection on a light-box of an image represented by an N-bit signal comprising the steps of:
  (A) applying said N-bit signal to a recording unit, said N-bit signal having been processed by:
    (i) determining $2^N$ density values to correspond with $2^N$ signal values by mapping the minimum and the maximum of said signal values respectively onto the minimum and the maximum of density values envisioned in the hard-copy and by calculating intermediate density values as $D_{i+1}=D_i+\text{Delta } D_1$ wherein $$\text{Delta } D_i = \log\left(1 - \left(0.0123 - \frac{(0.808 + (lum_i + \text{alfa})^{1/2})^2}{lum_i}\right)\right),$$

$D_i$ being an intermediate density value between $D_{min}$ and $D_{max}$, alfa being an integer value between 0 and 1040, $lum_i$=lumscale.$\pi$.$10^{-Di}$ being the specific illuminance level caused by $D_i$ expressed in cd/m² and lumscale being the luminance of said light-box, and by interpolating between the calculated density values, (ii) mapping successive intermediate signal values onto the determined successive density values, (B) converting the signal values into corresponding density values in the hard copy on said recording material by controlling said recording unit by means of said N-bit signal so as to generate on said recording material said corresponding density values.

2. The method according to claim 1 wherein N is equal to 8.

3. A method of making a hard-copy on a recording material for inspection on a light-box of an image represented by an N-bit signal comprising the steps of:

(A) applying said N-bit signal to a recording unit wherein said signal is first processed by mapping signal values of the N-bit signal onto corresponding density values according to a transfer curve that is characterised in that an increment between a first and a second density value corresponding with successive first and second signal values is equal to the minimum of density differences that are perceptible by the human eye at an overall density equal to said first density value, (B) generating a visible image by controlling said recording unit by means of said digital N-bit signal so as to generate on said recording material density values that are related to said digital signal values according to said transfer curve, and wherein said N-bit signal was obtained by performing windowing on a higher bit signal and wherein the window range was determined from a histogram of said higher bit segment using the ratio of the amplitude of a curve fitted through the tops of the histogram spikes versus the amplitude of a curve fitted through the feet of the histogram spikes, said window range being adapted to cover a region of interest.

4. The method according to claim 3 wherein a small gradient is allocated to said transfer curve in a low density region, a higher gradient in an intermediate density region and a still higher level in the high density region.

5. The method according to claim 3 wherein said region of interest is determined by setting a minimum window range and by evaluating images corresponding with signal values in window ranges obtained by starting from a minimum window range and by augmenting a window level and by determining in this way a region of the histogram wherein relevant histogram values are situated.

6. Method according to claim 3 wherein N is equal to 8.

7. A method of making a hard-copy on a recording material for inspection on a light-box of an image represented by an N-bit signal comprising the steps of:

(A) applying said N-bit signal to a recording unit wherein said signal is first processed by mapping signal values of the N-bit signal onto corresponding density values according to a transfer curve that is characterised in that an increment between a first and a second density value corresponding with successive first and second signal values is equal to the minimum of density differences that are perceptible by the human eye at an overall density equal to said first density value, (B) generating a histogram of said signal;

(C) detecting the number of spikes down to zero and, in case said number exceeds a preset application number, subjecting said signal to smoothing; and, (D) generating a visible image by controlling said recording unit by means of said digital N-bit signal so as to generate on said recording material density values that are related to said digital signal values according to said transfer curve.

8. Method according to claim 7 wherein N is equal to 8.

9. A method of making a hard-copy on a recording material for inspection on a light-box of an image represented by an N-bit signal comprising the steps of:

(A) applying said N-bit signal to a recording unit wherein said signal is first processed by mapping signal values of the N-bit signal onto corresponding density values according to a transfer curve that is characterised in that an increment between a first and a second density value corresponding with successive first and second signal values is equal to the minimum of density differences that are perceptible by the human eye at an overall density equal to said first density value, (B) generating a histogram of said signal;

(C) detecting the number of spikes down to zero and, in case said number exceeds a preset application number, subjecting said signal to addition of non-correlated noise; and, (D) a visible image is generated by controlling said recording unit by means of said digital N-bit signal so as to generate on said recording material density values that are related to said digital signal values according to said transfer curve.

10. Method according to claim 9 wherein N is equal to 8.

* * * * *